US009702190B2

(12) United States Patent
Schneider et al.

(10) Patent No.: US 9,702,190 B2

(45) Date of Patent: Jul. 11, 2017

(54) OPERATING CONTROL METHOD OF A MOTORIZED DRIVING DEVICE OF A HOME AUTOMATION INSTALLATION

(71) Applicant: SIMU, Gray (FR)

(72) Inventors: Thierry Schneider, Velet (FR); Guillaume Pailleret, Tromarey (FR); Vincent Jadot, Grandfontaine (FR)

(73) Assignee: SIMU, Gray (FR)

( * ) Notice: Subject to any disclaimer, the term of this patent is extended or adjusted under 35 U.S.C. 154(b) by 0 days.

(21) Appl. No.: 15/191,563

(22) Filed: Jun. 24, 2016

(65) Prior Publication Data

US 2016/0376843 A1 Dec. 29, 2016

(30) Foreign Application Priority Data

Jun. 24, 2015 (FR) ..................................... 15 55809

(51) Int. Cl.

*G05D 1/02* (2006.01)
*G05B 5/00* (2006.01)
*E06B 9/72* (2006.01)
*E06B 9/68* (2006.01)
*E06B 9/11* (2006.01)
*G08C 17/02* (2006.01)
*E06B 9/24* (2006.01)

(52) U.S. Cl.

CPC .................. *E06B 9/72* (2013.01); *E06B 9/11* (2013.01); *E06B 9/68* (2013.01); *G08C 17/02* (2013.01); *E06B 2009/2476* (2013.01); *E06B 2009/6809* (2013.01); *G08C 2201/114* (2013.01); *G08C 2201/12* (2013.01)

(58) Field of Classification Search

None

See application file for complete search history.

(56) References Cited

U.S. PATENT DOCUMENTS

| | | | | |
|---|---|---|---|---|
| 5,134,347 | A | 7/1992 | Koleda | |
| 2007/0007923 | A1* | 1/2007 | Johansen | E06B 9/68 318/483 |
| 2008/0150461 | A1 | 6/2008 | Adamus et al. | |

FOREIGN PATENT DOCUMENTS

| | | | |
|---|---|---|---|
| FR | 2 610 668 A1 | 8/1988 | |
| FR | 2 806 510 A1 | 9/2001 | |

(Continued)

OTHER PUBLICATIONS

FR Search Report, dated May 10, 2016, from corresponding FR application.

*Primary Examiner* — Bentsu Ro
*Assistant Examiner* — Zemenay Truneh
(74) *Attorney, Agent, or Firm* — Young & Thompson

(57) ABSTRACT

An operating control method of a motorized driving device of a home automation installation comprises at least one step for entering a configuration mode of the device, a step for pairing a control point with an electronic control unit of the device, a step for activating at least one selection element of the control point during a predetermined time period beginning after the pairing step and a step for entering a second standby state of a control order receiving module of the electronic control unit. The second standby state of the control order receiving module has a wake-up frequency of the control order receiving module lower than the wake-up frequency of the control order receiving module in a first standby state.

13 Claims, 5 Drawing Sheets

(56) References Cited

FOREIGN PATENT DOCUMENTS

| | | | |
|---|---|---|---|
| FR | 2 842 860 | A1 | 1/2004 |
| FR | 2 910 523 | A1 | 6/2008 |
| WO | 2012/007448 | A1 | 1/2012 |

* cited by examiner

OPERATING CONTROL METHOD OF A MOTORIZED DRIVING DEVICE OF A HOME AUTOMATION INSTALLATION

FIELD OF THE INVENTION

The present invention relates to an operating control method of a motorized driving device of a closure or sun-protection home automation installation.

In general, the present invention relates to the field of concealment devices comprising a motorized driving device setting a screen in motion between at least one first position and one second position.

BACKGROUND OF THE INVENTION

A motorized driving device comprises an electromechanical actuator for a movable element for closing, concealing or providing sun protection such as a shutter, door, gate, blind, or any other equivalent material, hereinafter referred to as a screen.

Document FR 2,610,668 A1 is already known, and describes a motorized driving device for a closure or sun protection home automation installation comprising an electromechanical actuator, an electronic control unit and an autonomous power supply device. The autonomous power supply device comprises a battery and a photovoltaic cell. The electromechanical actuator is electrically connected to the autonomous power supply device. The electronic control unit comprises a wireless control order receiving module.

The electronic control unit is configured to detect information sent via a power line connecting the photovoltaic cell to the electromechanical actuator using a switch positioned on the power line, as well as using elements for detecting variations of the voltage on the power supply line.

Such a motorized driving device also comprises a control point, in particular a remote control. The motorized driving device is controlled by the control point using a wireless command. The control point comprises at least one selection element.

The motorized driving device is configured to operate in a control mode and in a configuration mode. In the control mode, the control order receiving module of the electronic control unit can be placed in a standby state.

Prior to a step for pairing the control point with the electronic control unit of the motorized driving device, a step for entering the configuration mode of the motorized driving device is implemented.

The entry in the configuration mode of the motorized driving device may be implemented by pressing on a programming selection element of the control point or by simultaneous pressing on two selection elements of the control point, the two selection elements of the control point being the raising and lowering keys of a screen of the closure or sun-protection home automation installation.

However, this motorized driving device has the drawback of adding an electronic control board to the autonomous power supply device including the switch positioned on the power supply line connecting the photovoltaic cell to the electromechanical actuator to inhibit the operation of the wireless control order receiving module, so as to limit the electricity consumption by the electronic control device and prevent draining the battery, between the assembly moment of the motorized driving device in the plant and the commissioning moment of the motorized driving device in the closure or sun-protection home automation installation.

Thus, the addition of this electronic control board including the switch creates an excess cost on the motorized driving device.

Furthermore, the use of such a switch positioned on the power supply line connecting the photovoltaic cell to the electromechanical actuator requires being able to access the latter, following the assembly of the motorized driving device, in particular in a box of the closure or sun-protection home automation installation.

Furthermore, the wireless control order receiving module of the electronic control unit of the motorized driving device may only be placed in a standby state when the control mode of the motorized driving device is active, and in an inhibiting state when the configuration mode of the motorized driving device is active.

SUMMARY OF THE INVENTION

The present invention aims to resolve the aforementioned drawbacks and propose an operating control method of the motorized driving device of a closure or sun-protection home automation installation making it possible to reduce the electricity consumption by an electronic control unit and avoid depleting at least one battery, between the assembly moment of the motorized driving device in the plant and the commissioning moment of the motorized driving device in the closure or sun-protection home automation installation, as well as during the use of the commissioned motorized driving device in the closure or sun-protection home automation installation.

To that end, the present invention relates to an operating control method of a motorized driving device of a closure or sun-protection home automation installation,

- the motorized driving device comprising:
  - an electromechanical actuator,
  - an electronic control unit,
    - the electronic control unit comprising at least one wireless control order receiving module,
  - an autonomous power supply device, the autonomous power supply device comprising at least one battery,
    - the electromechanical actuator being electrically connected to the autonomous power supply device,
  - a control point,
    - the motorized driving device being controlled by the control point using a wireless command,
    - the control point comprising at least one selection element,
  - the motorized driving device being configured to operate in at least:
    - a control mode, in which the control order receiving module of the electronic control unit can be placed in a first standby state, and
    - a configuration mode.

The control method comprises at least:

- a step for entering the configuration mode of the motorized driving device,
- a step for pairing the control point with the electronic control unit of the motorized driving device, following the step for entering the configuration mode of the motorized driving device.

According to the invention, the control method comprises at least:

- a step for activating at least one selection element of the control point during a predetermined time period beginning after the step for pairing the control point with the electronic control unit of the motorized driving device, a step for entering a second standby state of the control order receiving module of the electronic control unit, following the step for activating at least one selection element of the control point, where the second standby state of the control order receiving module of the electronic control unit has a wake-up frequency of the control order receiving module lower than the wake-up frequency of the control order receiving module of the electronic control unit in the first standby state.

Thus, the wireless control order receiving module of the electronic control unit of the motorized driving device may be placed in a first standby state when the control mode of the motorized driving device is active, and in a second standby state from the configuration mode of the motorized driving device. The control order receiving module of the electronic control unit of the motorized driving device is woken up at a longer wake-up frequency in the second standby state than in the first standby state.

In this way, following the activation of at least one selection element of the control point during the predetermined time period beginning after the step for pairing the control point with the electronic control unit of the motorized driving device, the control order receiving module of the electronic control unit is placed in the second standby state, so as to reduce the electricity consumption by the electronic control unit and avoid depleting the battery.

Furthermore, the entry of the wireless control order receiving module of the electronic control unit in the second standby state following the pairing of the control point with the electronic control unit of the motorized driving device and the activation of at least one selection element of the control point during the predetermined time period, in the configuration mode of the motorized driving device, makes it possible to do away with an electronic control board at the autonomous electricity supply device, while making it possible to reduce the electricity consumed by the electronic control unit and avoid depleting the battery.

Furthermore, the elimination of the electronic control board at the autonomous electricity supply device makes it possible to reduce the cost of obtaining the motorized driving device and avoid product quality risks related to the integration of an electronic control board in the autonomous electricity supply device.

In practice, following the step for activating at least one selection element of the control point, the method comprises:

a step for receiving an order signal by the control order receiving module of the electronic control unit, and a step for decoding the frame of the signal of the order received by the control order receiving module, while the step for entering the second standby state of the electronic control unit of the motorized driving device is carried out when the frame of the signal of the received order includes predetermined identifiers.

Advantageously, the predetermined identifiers of the frame of the signal of the received order correspond to the identifier of the control point paired with the electronic control unit of the motorized driving device, during the pairing step, and to the identifier or identifiers of an activation sequence for at least one selection element of the control point according to a predetermined sequence, during the step for activating.

In practice, following the step for decoding the frame of the signal of the received order, the method comprises a step for signaling the entry in the second standby state of the electronic control unit.

Preferably, the second standby state of the control order receiving module of the electronic control unit has a predetermined threshold value for the receiving power level of a signal above the predetermined threshold value of the receiving power level of a signal in the first standby state of the control order receiving module of the electronic control unit.

Advantageously, the autonomous power supply device also comprises at least one photovoltaic cell.

According to one preferred feature of the invention, the control method comprises at least:

a step for measuring a property of the power supply of the electromechanical actuator by said at least one photovoltaic cell, a step for comparing the measured property to a predetermined threshold value, and a step for entering an inhibition state of the control order receiving module of the electronic control unit, when the measured property is below the predetermined threshold value.

In a first embodiment, when the control order receiving module of the electronic control unit is placed in the second standby state, the method comprises at least:

a step for receiving an order signal by the control order receiving module of the electronic control unit, a step for measuring the power level of the signal of the order received by the control order receiving module, a step for comparing the power level of the signal of the order received to a predetermined threshold value, a step for decoding the frame of the signal of the order received by the control order receiving module, when the power level of the signal of the received order is above the predetermined threshold value, and a step for exiting the second standby state of the control order receiving module of the electronic control unit of the motorized driving device, when the frame of the signal of the received order includes predetermined identifiers.

Preferably, following the step for decoding the frame of the signal of the received order, the control method comprises a step for verifying the reception of the order signal during a consecutive listening period by the control order receiving module, the consecutive listening period being the listening period of the control order receiving module following the listening period during which the signal of the order was received for the first time by the control order receiving module. Additionally, the step for exiting the second standby state of the electronic control unit of the motorized driving device is carried out when the signal of the order is received during the consecutive listening period.

In practice, following the step for exiting the second standby state of the control order receiving module of the electronic control unit of the motorized driving device, the control method comprises a step for entering the first standby state.

In a second embodiment, when the control order receiving module of the electronic control unit of the motorized driving device is placed in the second standby state, the control method comprises at least:

a step for detecting supply and cutoff periods of the electricity supply of the electromechanical actuator from the autonomous power supply device, only using elements for measuring a property related to the electricity supply of the electromechanical actuator by the autonomous power supply device, a step for simulating a sequence of supply and cut off periods of the electricity supply of the electromechanical actuator, where the supply and cut off periods of the electricity supply are detected through measuring elements, and a step for exiting the second standby state of the control order receiving module of the electronic control unit.

In practice, following the step for exiting the second standby state of the control order receiving module of the electronic control unit, the control method comprises a step for entering the configuration mode of the motorized driving device.

Advantageously, the control method comprises a step for signaling the exit from the second standby state of the control order receiving module of the electronic control unit.

The invention also pertains to a data recording medium, readable by a computer, on which a computer program is saved comprising computer code program information to carry out the steps of the control method previously defined.

The invention also pertains to a computer program comprising computer program code means suitable for carrying out the steps of the control method previously defined, when the program is run by a computer.

Other particularities and advantages of the invention will also appear in the description below.

BRIEF DESCRIPTION OF THE DRAWINGS

In the appended drawings, provided as non-limiting examples.

DETAILED DESCRIPTION OF THE INVENTION

Figure 1:
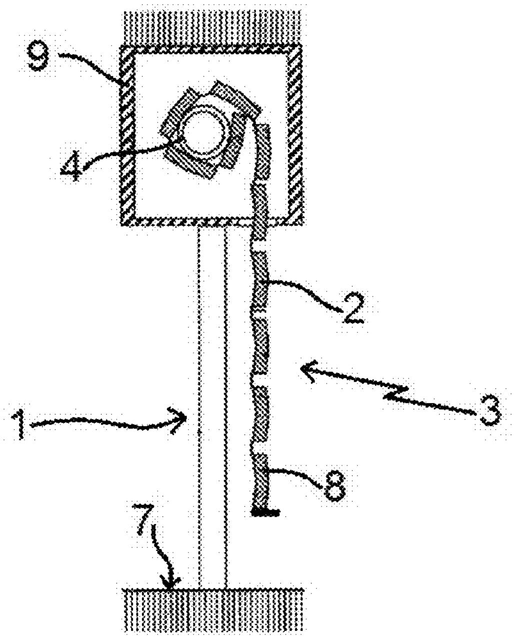
FIG. 1 is a cross-sectional diagrammatic view of a home automation installation according to one embodiment of the invention.
Figure 2:
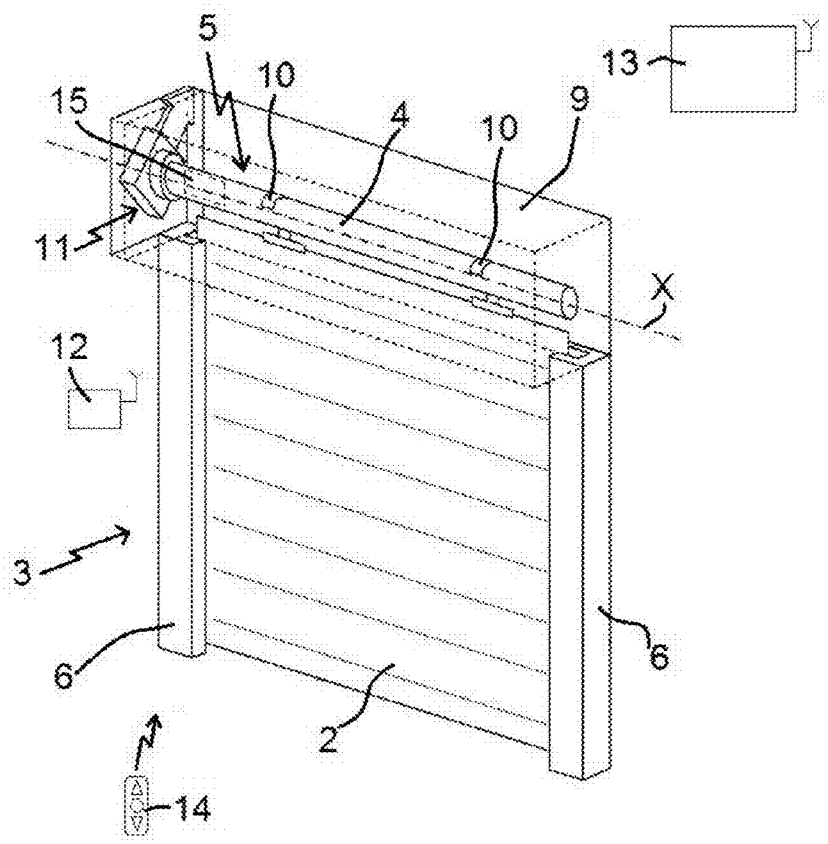
FIG. 2 is a diagrammatic perspective view of the home automation installation illustrated in FIG. 1.

In reference to FIGS. 1 and 2, we will first describe a home automation installation according to the invention and installed in a building comprising an opening 1, window or door, equipped with a screen 2 belonging to a concealing device 3, in particular a motorized rolling shutter.

The concealing device 3 can be a rolling shutter, a canvas blind or blinds with orientable slats, or a rolling gate. The present invention applies to all types of concealing devices.

A rolling shutter according to one embodiment of the invention will be described in reference to FIGS. 1 and 2.

The screen 2 of the concealing device 3 is wound on a winding tube 4 driven by a motorized driving device 5 and movable between a wound position, in particular an upper position, and an unwound position, in particular a lower position.

The moving screen 2 of the concealing device 3 is a closing, concealing and/or sun protection screen, winding on the winding tube 4, the inner diameter of which is substantially equivalent to the outer diameter of an electromechanical actuator 11, such that the electromechanical actuator 11 can be inserted into the winding tube 4 during the assembly of the concealing device 3.

The motorized driving device 5 comprises the electromechanical actuator 11, in particular of the tubular type, making it possible to set the winding tube 4 in rotation so as to unwind or wind the screen 2 of the concealing device 3.

The concealing device 3 comprises the winding tube 4 for winding the screen 2, where, in the mounted state, the electromechanical actuator 11 is inserted into the winding tube 4.

In a known manner, a rolling shutter 3 comprises an apron comprising horizontal slats articulated on one another, forming the screen 2 of the rolling shutter 3, and guided by two lateral guideways 6. These slats are joined when the apron 2 of the rolling shutter 3 reaches its unwound lower position.

In the case of a rolling shutter, the wound upper position corresponds to the bearing of a final L-shaped end slat 8 of the apron 2 of the rolling shutter 3 against an edge of a box 9 of the rolling shutter 3, and the unwound lower position corresponds to the bearing of the final end slat 8 of the apron 2 of the rolling shutter 3 against a threshold 7 of the opening 1.

The first slat of the rolling shutter 3, opposite the end slat, is connected to the winding tube 4 using at least one articulation 10.

The winding tube 4 is positioned inside the box 9 of the rolling shutter 3. The apron 2 of the rolling shutter 3 winds and unwinds around the rolling tube 4 and is housed at least partially inside the box 9.

In general, the box 9 is positioned above the opening 1, or in the upper part of the opening 1.

The motorized driving device 5 is controlled by a control unit. The control unit may for example be a local control unit 12, where the local control unit 12 can be connected through a wired or wireless connection with a central control unit 13. The central control unit 13 drives the local control unit 12, as well as other similar local control units distributed throughout the building.

The central control unit 13 can be in communication with a weather station located outside the building, in particular including one or more sensors that can be configured for example to determine the temperature, brightness, or wind speed.

A remote control 14, which can be a type of local control unit, and provided with a control keypad, which comprises selection and display means, further allows a user to intervene on the electromechanical actuator 11 and/or the central control unit 13.

The motorized driving device 5 is preferably configured to carry out the unwinding or winding commands of the screen 2 of the concealing device 3, which may in particular be acquired by the remote control 14.

The electromechanical actuator 11 comprises an electric motor 16. The electric motor 16 comprises a rotor and a stator, not shown and positioned coaxially around a rotation axis X, which is also the rotation axis of the winding tube 4 in the assembled configuration of the motorized driving device 5.

Control means for controlling the electromechanical actuator 11, making it possible to move the screen 2 of the concealing device 3, are made up of at least one electronic control unit 15. This electronic control unit 15 is able to operate the electric motor 16 of the electromechanical actuator 11, and in particular to allow the supply of electricity for the electric motor 16.

Thus, the electronic control unit 15 in particular controls the electric motor 16, so as to open or close the screen 2, as previously described.

Figure 4:
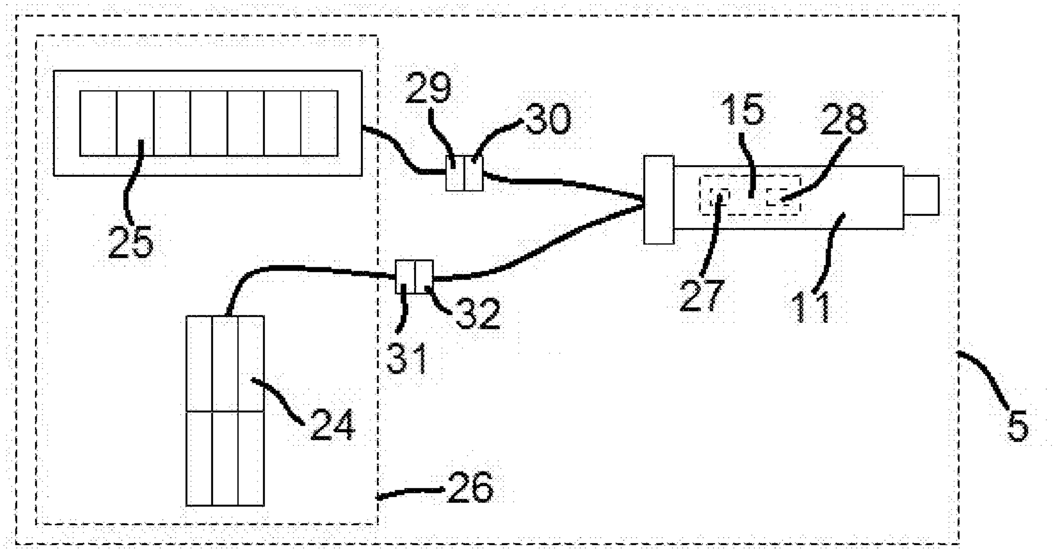
FIG. 4 is a diagrammatic view of a motorized driving device for a home automation installation as illustrated in FIGS. 1 to 3.

The electronic control unit 15 also comprises an order receiving module 27, as illustrated in FIG. 4, the control orders being sent by an order transmitter such as the remote control 14 designed to control the electromechanical actuator 11 or one of the local 12 or central 13 control units.

Preferably, the control order receiving module 27 of the electronic control unit 15 is of the wireless type. In particular, the control order receiving module 27 is configured to receive radio control orders.

The control order receiving module 27 can also allow the reception of control orders sent by wired means.

The control means of the electromechanical actuator 11 comprise hardware and/or software means.

As one non-limiting example, the hardware means may comprise at least one microcontroller.

The electromechanical actuator 11 belonging to the home automation installation of FIGS. 1 and 2 will now be described in reference to FIG. 3.

The electromechanical actuator 11 is supplied with electricity using at least one battery 24, able to be recharged by at least one photovoltaic cell 25, as illustrated in FIG. 4.

Here, the electromechanical actuator 11 comprises a power supply cable 18 making it possible to supply electricity from the battery 24.

A casing 17 of the electromechanical actuator 11 is preferably cylindrical.

In one embodiment, the casing 17 is made from a metal material.

Of course, the material of the electromechanical actuator is in no way limiting and may be different, and in particular made from plastic.

The electromechanical actuator 11 comprises also a reducing gear device 19 and an output shaft 20.

The electromechanical actuator 11 may also comprise an end-of-travel and/or obstacle detection device, which may be mechanical or electronic.

Advantageously, the electric motor 16 and the reducing gear device 19 are positioned inside the casing 17 of the electromechanical actuator 11.

The output shaft 20 of the electromechanical actuator 11 is positioned inside the winding tube 4, and at least partially outside the casing 17 of the electromechanical actuator 11.

The output shaft 20 of the electromechanical actuator 11 is coupled by a connecting means 22 to the winding tube 4, in particular using a wheel-shaped connecting means.

The electromechanical actuator 11 comprises also a closing off element 21 for one end of the casing 17.

Here, the casing 17 of the electromechanical actuator 11 is fastened to a support 23, in particular a flange, of the box 9 of the concealing device 3 using the closing off element 21 forming a torque pin, in particular a closing off and torque-reacting head. In such a case where the closing off element 21 forms a torque pin, the closing off element 21 is also called a fixed point of the electromechanical actuator 11.

Figure 3:
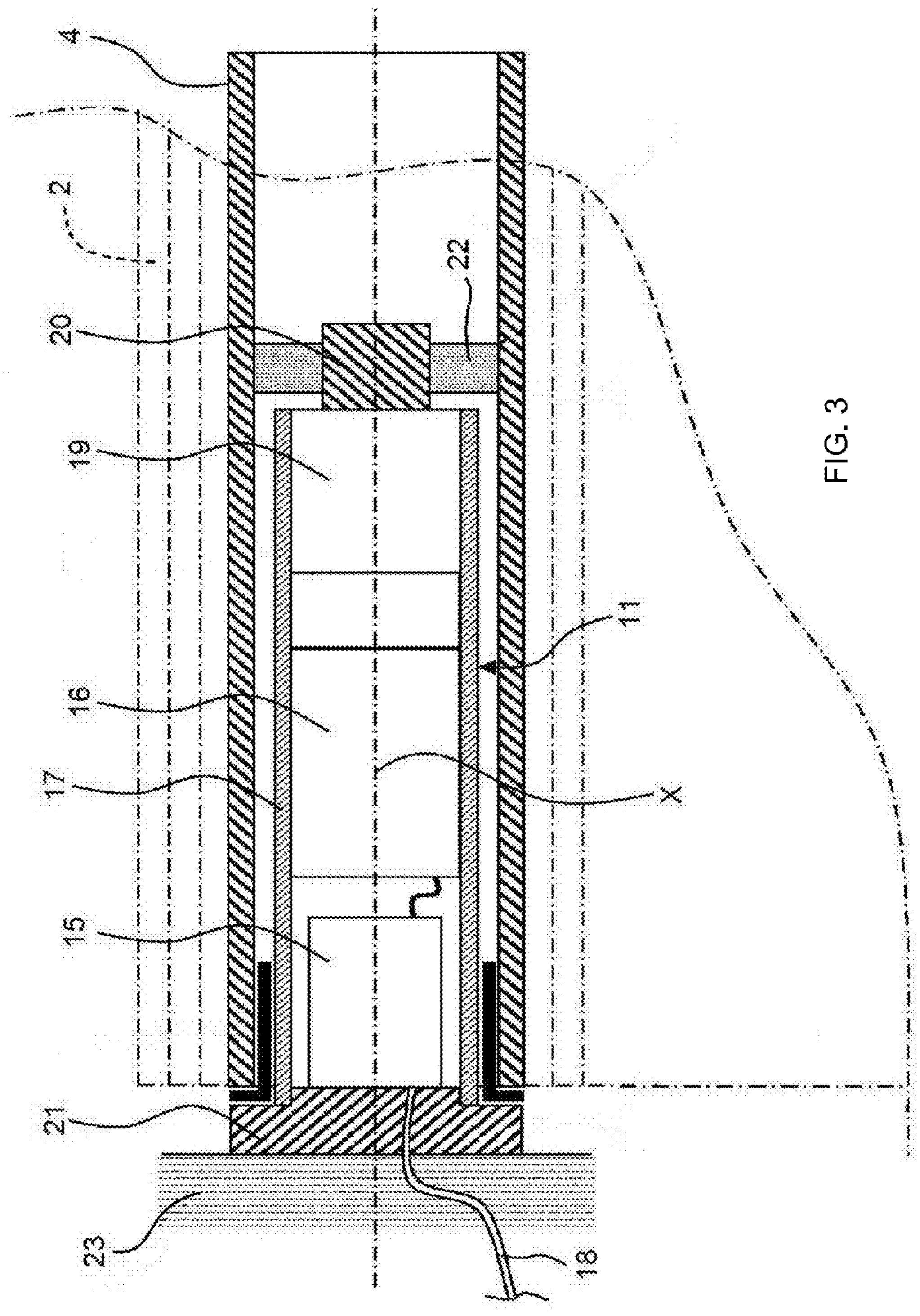
FIG. 3 is a longitudinal diagrammatic partial sectional view of the home automation installation illustrated in FIG. 2.

Here, and as illustrated in FIG. 3, the electronic control unit 15 is positioned inside a casing 17 of the electromechanical actuator 11.

Thus, the electronic control unit 15 is incorporated inside a casing 17 of the electromechanical actuator 11.

In another embodiment, the electronic control unit 15 is positioned outside the casing 17 of the electromechanical actuator 11, and in particular, mounted on the support 23 or in the closing off element 21.

We will now describe, in reference to FIG. 4, a motorized driving device of a closure or sun-protection home automation installation according to one embodiment of the invention.

The motorized driving device 5 comprises an autonomous power supply device 26. The electromechanical actuator 11 is electrically connected to the autonomous power supply device 26.

The autonomous power supply device 26 comprises the battery or batteries 24, and preferably the photovoltaic cell(s) 25.

Here, the battery 24 is positioned inside the box 9 of the concealing device 3.

Alternatively, the battery 24 is positioned inside a lateral guideway 6 to guide the screen 2 of the concealing device 3.

In the following description, the expression "the battery 24" is used to designate one or more batteries depending on the configuration of the autonomous power supply device 26. Likewise, the expression "the photovoltaic cell 25" is used to designate one or more photovoltaic cells depending on the configuration of the autonomous power supply device 26.

Here and as illustrated in FIG. 4, the photovoltaic cell 25 is directly electrically connected to the electronic control unit 15. Additionally, the battery 24 is directly electrically connected to the electronic control unit 15.

Alternatively, not shown, the photovoltaic cell 25 is electrically connected to the battery 24. Furthermore, the battery 24 is electrically connected to the electronic control unit 15.

Here, the battery 24 is of the rechargeable type and supplies electricity to the electromechanical actuator 11. Furthermore, the battery 24 is supplied with electricity by the photovoltaic cell 25.

Thus, the recharging of the battery 24 is done by solar energy, using the photovoltaic cell 25.

In this way, the battery 24 can be recharged without having to disassemble part of the home automation installation, and in particular, of the box 9 of the concealing device 3.

Advantageously, the motorized driving device 5, and in particular the electronic control unit 15, comprises charging elements configured to charge the battery 24 from the solar energy recovered by the photovoltaic cell 25.

Thus, the charging elements configured to charge the battery 24 from the solar energy make it possible to convert the solar energy recovered by the photovoltaic cell 25 into electricity.

In one embodiment, the autonomous power supply device 26 comprises a plurality of photovoltaic cells 25 making up a photovoltaic panel.

In one embodiment, the electricity supply of the electromechanical actuator 11 by the battery 24 makes it possible to replace a power supply of the electromechanical actuator 11 with an electricity supply grid.

Thus, the electricity supply of the electromechanical actuator 11 by the battery 24 makes it possible to do away with a connection to the electricity supply grid.

In another embodiment, the electricity supply of the electromechanical actuator 11 is done on the one hand by an electricity supply grid, and on the other hand by the battery 24.

Thus, the electricity supply of the electromechanical actuator 11 by the battery 24 in particular makes it possible to make up for a cutoff of the electricity supply of the electromechanical actuator 11 with an electricity supply grid.

In this case, the electromechanical actuator 11 is supplied with electricity, on the one hand by a power supply cable connected to the electricity supply grid, and on the other hand by the battery 24.

Furthermore, the electricity supply of the electromechanical actuator 11 by an electricity supply grid makes it possible to recharge the battery 24, in particular when the battery 24 is not sufficiently recharged by the photovoltaic cell 25.

The electronic control unit 15 is configured to detect supply and cut off periods of the electricity supply of the electromechanical actuator 11 from the photovoltaic cell 25, only via elements 28 measuring a property G related to the electricity supply of the electromechanical actuator 11 by the photovoltaic cell 25.

The property G related to the electricity supply delivered by the photovoltaic cell 25 may in particular be a voltage or a current.

The value of the property G related to the electricity supply of the electromechanical actuator 11 by the photovoltaic cell 25 is proportional to the light power captured by the photovoltaic cell 25, in other words, the value of this property G supplying electricity to the electromechanical actuator 11 depends on the light intensity of the solar energy captured by the photovoltaic cell 25.

Here, the measuring elements 28 are an integral part of the electronic control unit 15.

As non-limiting examples, the measuring elements 28 may comprise either a voltage divider, a comparator and a microcontroller, one of the inputs of which is provided with an analog-digital converter, if the measured property G is a voltage U, or a shunt resistance and a microcontroller, one of the inputs of which is provided with an analog-digital converter, if the measured property G is a current I.

The motorized driving device 5 is provided to operate at least in a control mode and a configuration mode.

The entry in the configuration mode of the motorized driving device 5 may be implemented by switching between the control mode and the configuration mode of the motorized driving device 5.

Advantageously, the electronic control unit 15 of the motorized driving device 5 is configured to switch from a control mode of the motorized driving device 5 to a configuration mode of the motorized driving device 5, and vice versa.

In the control mode, the control order receiving module 27 of the electronic control unit 15 can be placed in a first standby state.

The entry in the first standby state is implemented after a time period elapses beginning after the performance of a control order received by the control order receiving module 27 of the electronic control unit 15 of the motorized driving device 5.

As a non-limiting example, the predetermined time period after which the control order receiving module 27 of the electronic control unit 15 is placed in the first standby state is approximately two seconds.

Figure 5:
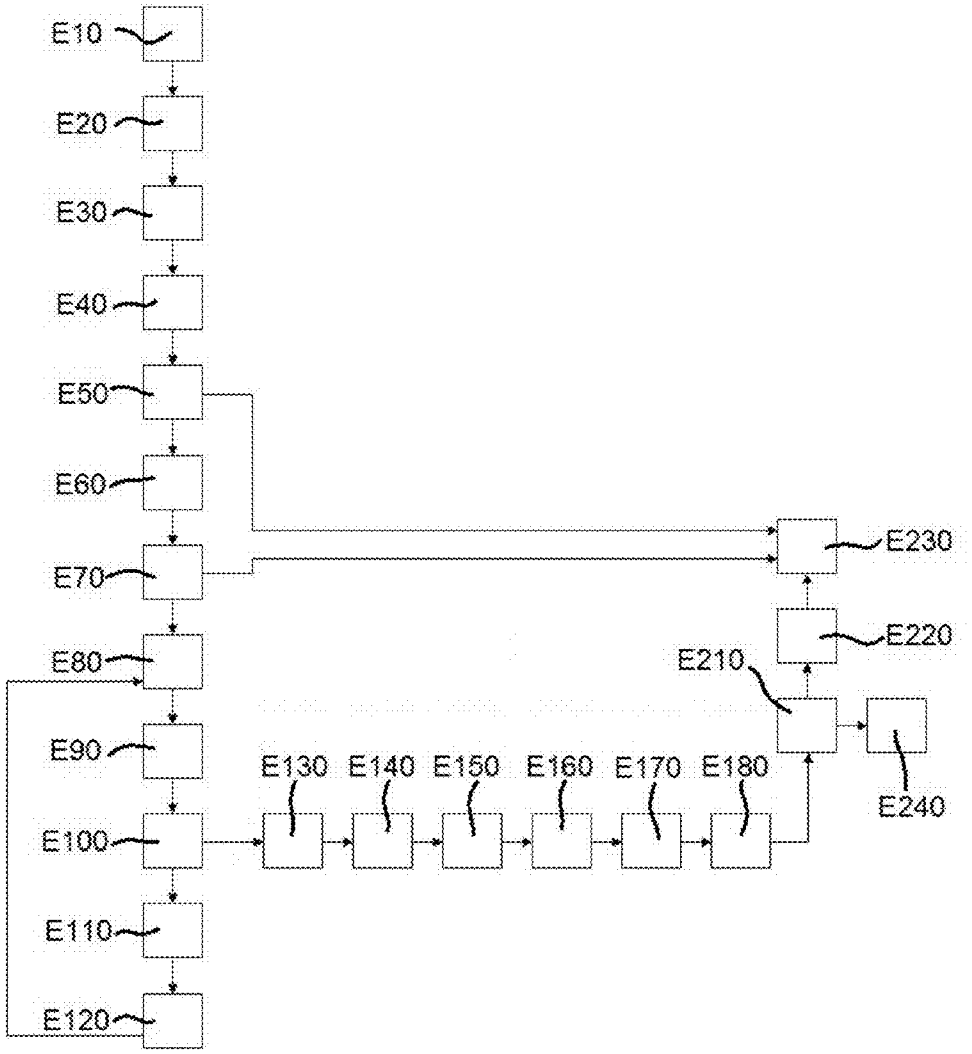
FIG. 5 is a block diagram of an algorithm of an operating control method according to a first embodiment of the invention of a motorized driving device of a home automation installation illustrated in FIGS. 1 to 4.

In reference to FIG. 5, we will now describe one embodiment of a method, according to a first embodiment of the invention, for control, during operation, of the motorized driving device of a home automation installation illustrated in FIGS. 1 to 4.

In this embodiment, the operating control method of the motorized driving device 5 of the home automation installation comprises a step E10 for entering the configuration mode of the motorized driving device 5.

In one embodiment, the step E10 for entering the configuration mode of the motorized driving device 5 is carried out by simultaneously pressing on two selection elements of a control point 12, 14, in particular the remote control 14, for example the selection elements for raising and lowering the screen 2.

Furthermore, the simultaneous pressing on the two selection elements of the control point 12, 14 is carried out during at least one predetermined time period T1, which may be approximately one half-second.

In another embodiment, the step E10 for entering the configuration mode of the motorized driving device 5 is carried out by pressing on the programming selection element of a control point 12, 14, in particular the remote control 14.

After the motorized driving device 5 has entered the configuration mode, the control method comprises a step E20 for signaling the configuration mode.

In practice, the signaling step E20 is carried out by a movement of the screen 2 controlled by the motorized driving device 5.

Preferably, the movement of the screen 2 corresponds to a round-trip movement of the screen 2, in particular over a short distance that may for example be around one centimeter.

Alternatively, the signaling step E20 is carried out by transmitting a sound signal, in particular using a sound transmission element of the electronic control unit 15.

Here, the signaling step E20 is carried out after the step E10 for entering the configuration mode of the motorized driving device 5.

Advantageously, the control method comprises a step E30 for adjusting the upper and lower end-of-travel positions of the screen 2, which may be carried out either manually or automatically.

Thus, the step E30 for adjusting the end-of-travel positions makes it possible to define the movement travel of the screen 2 of the concealing device 3, during the raising of the screen 2 and the lowering of the screen 2.

Next, the control method comprises a step E40 for pairing the control point 12, 14, in particular the remote control 14, with the electronic control unit 15 of the motorized driving device 5.

The step E40 for pairing the control point 12, 14 with the electronic control unit 15 is carried out following the step E10 for entering the configuration mode of the motorized driving device 5, and in particular, following the step E30 for adjusting the end-of-travel positions of the screen 2.

Thus, the pairing step E40 makes it possible to save, in a memory of the electronic control unit 15, the identifier of the control point 12, 14.

Here, the memory storing the identifier of the control point 12, 14 is made up by a memory of a microcontroller of the electronic control unit 15, in particular a memory of the EEPROM (Electrically Erasable Programmable Read Only Memory) type.

The steps E30, E40 for adjusting the end-of-travel positions of the screen 2 and pairing the control point 12, 14 with the electronic control unit 15 are carried out in the configuration mode of the motorized driving device 5.

The method comprises a step E50 for activating at least one selection element of the control point 12, 14, in particular the remote control 14, during a predetermined time period T2 beginning after the pairing step E40.

As a non-limiting example, the predetermined time period T2 during which the activation can be done of at least one selection element of the control point 12, 14 is approximately two minutes.

The activation step E50 for at least one selection element of the control point 12, 14 is carried out by the user.

Furthermore, the activation step E50 is carried out by pressing on one or several selection elements of the control point 12, 14 during a predetermined time period T3.

As a non-limiting example, the predetermined time period T3 during which the pressing on one or several selection elements of the control point 12, 14 is done is approximately two seconds.

The pressing on one or several selection elements of the control point 12, 14 during the predetermined time period T3, defined for the activation step E50, corresponds to a predetermined sequence.

Preferably, the activation step E50 is carried out by simultaneous pressing on several selection elements of the control point 12, 14 during the predetermined time period T3.

Here and non-limitingly, the simultaneous pressing on the selection elements of the control point 12, 14, in particular of the remote control 14, corresponds to simultaneous pressing on the raising, stopping and lowering selection elements of the screen 2. Additionally, the predetermined time period T3 during which the selection elements of the control point 12, 14 must be activated simultaneously is approximately two seconds.

Following the step E50 for activating at least one selection element of the control point 12, 14, the method comprises a step E80 for entering a second standby state of the control order receiving module 27 of the electronic control unit 15 of the motorized driving device 5.

The entry in the second standby state of the control order receiving module 27 of the electronic control unit 15 is carried out from the configuration mode of the motorized driving device 5 and following the step E40 for pairing the control point 12, 14 with the electronic control unit 15, and preferably following the step E30 for adjusting the end-of-travel positions of the screen 2.

The activation step E50 for at least one selection element of the control point 12, 14 corresponds to a step for confirming the entry in the second standby state.

If the step E50 for activating at least one selection element of the control point 12, 14 is not carried out during the predetermined time period T2, or if at least one selection element of the control point 12, 14 activated, during the activation step E50, does not correspond to that of the predetermined sequence, or if at least the selection element of the control point 12, 14 is activated, during the activation step E50, for a duration shorter than the predetermined time period T3, the control method carries out a step E230 for entering the first standby state of the control order receiving module 27 of the electronic control unit 15.

Thus, in such cases, the step E80 for entering the second standby state of the control order receiving module 27 of the electronic control unit 15 is not carried out.

Advantageously, the battery 24 can be recharged by the photovoltaic cell 25 in the second standby state of the control order receiving module 27 of the electronic control unit 15.

The second standby state of the control order receiving module 27 of the electronic control unit 15 has a wake-up frequency of the control order receiving module 27 lower than the wake-up frequency of the control order receiving module 27 of the electronic control unit 15 in the first standby state.

The first standby state may also be called "short standby", and the second standby state may also be called "long standby".

Thus, the wireless control order receiving module 27 of the electronic control unit 15 may be placed in a first standby state when the control mode of the motorized driving device 5 is active, and in a second standby state from the configuration mode of the motorized driving device 5.

Here, as long as the wireless control order receiving module 27 of the electronic control unit 15 is placed in the second standby state, the motorized driving device 5 is kept in the configuration mode.

As mentioned above, the wireless control order receiving module 27 of the electronic control unit 15 is woken up at a longer wake-up frequency in the second standby state than in the first standby state.

As a non-limiting example, the wake-up frequency of the control order receiving module 27 in the first standby state is approximately 60 milliseconds and the wake-up frequency of the control order receiving module 27 in the second standby state is approximately 4.5 seconds.

In this way, following the activation of at least one selection element of the control point 12, 14 during the predetermined time period T2, the control order receiving module 27 of the electronic control unit 15 is placed in the second standby state, so as to reduce the electricity consumption by the electronic control unit 15 and avoid depleting the battery 24.

Furthermore, the entry of the control order receiving module 27 of the electronic control unit 15 in the second standby state following the pairing of the control point 12, 14 with the electronic control unit 15 and the activation of at least one selection element of the control point 12, 14 during the predetermined time period T2, in the configuration mode of the motorized driving device 5, makes it possible to do away with an electronic control board at the autonomous electricity supply device 26, while making it possible to reduce the electricity consumed by the electronic control unit 15 and avoid depleting the battery 24.

Furthermore, the elimination of the electronic control board at the autonomous electricity supply device 26 makes it possible to reduce the cost of obtaining the motorized driving device 5 and avoid product quality risks related to the integration of an electronic control board in the autonomous electricity supply device 26.

In practice, following the step E50 for activating at least one selection element of the control point 12, 14, the method comprises a step E60 for receiving a signal of an order by the control order receiving module 27 of the electronic control unit 15 and a step E70 for decoding the frame of the signal of the order received by the control order receiving module 27.

The step E80 for entering the second standby state of the electronic control unit 15 is carried out when the frame of the signal of the received order includes predetermined identifiers.

Advantageously, the predetermined identifiers of the frame of the signal of the received order correspond to the identifier of the paired control point 12, 14 in particular the paired remote control 14, with the electronic control unit 15 of the motorized driving device 5, during the pairing step E40, and to the identifier or identifiers of an activation sequence for at least one selection element of the control point 12, 14 according to a predetermined sequence, during the activation step E50.

Following the step E70 for decoding the frame of the signal of the received order, the method comprises a step E90 for signaling the entry in the second standby state of the electronic control unit 15 of the motorized driving device 5.

In practice, the signaling step E90 is carried out by a movement of the screen 2 controlled by the motorized driving device 5.

Preferably, the movement of the screen 2 corresponds to a round-trip movement of the screen 2, in particular over a short distance that may for example be around one centimeter.

Alternatively, the signaling step E90 is carried out by transmitting a sound signal, in particular using a sound transmission element of the electronic control unit 15.

Here, the signaling step E90 is carried out after the step E80 for entering the second standby state of the motorized driving device 15.

In the case where the identifiers determined during the step E70 for decoding of the frame of the signal of the received order do not correspond to the predetermined identifiers, the control method carries out the step E230 for entering the first standby state of the control order receiving module 27 of the electronic control unit 15.

Thus, in such a case, the step E80 for entering the second standby state of the control order receiving module 27 is not carried out.

Defined as first predetermined threshold value V1 for the first standby state of the control order receiving module 27 is a minimum power value that must have a radio signal to be taken into account by the control order receiving module 27 when it is in that state.

Defined as second predetermined threshold value V2 for the second standby state of the control order receiving module 27 is a minimum power value that must have a radio signal to be taken into account by the control order receiving module 27 when it is in that state.

Preferably, the second standby state of the control order receiving module 27 of the electronic control unit 15 has a predetermined threshold value V2 for the receiving power level of a signal above a first predetermined threshold value V1 of the receiving power level of a signal in the first standby state of the control order receiving module 27 of the electronic control unit 15.

Thus, in the second standby state, the control order receiving module 27 of the electronic control unit 15 is less sensitive to the signals emitted by control points further away than the control point(s) 12, 14 paired with the electronic control unit 15, so as not to carry out steps E60, E70 for receiving a signal of an order and decoding the frame of the signal of the received order, when the signals are weak, i.e., have a power below the second predetermined threshold value V2.

In this way, the increase of the second predetermined threshold value V2 of the receiving power level of a signal in the second standby state relative to the first standby state makes it possible to reduce the electricity consumption by the electronic control unit 15 and avoid depleting the battery 24.

Furthermore, the increasing of the second predetermined threshold value V2 makes it possible to eliminate pollution generated by the transmission of control order signals by control points not paired with the electronic control unit 15 of the motorized driving device 5.

Furthermore, if the control point 12, 14 paired with the electronic control device 15 is a remote control 14, the increasing of the second predetermined threshold value V2 makes it possible to guarantee that the distance is shorter between the remote control 14 and the electronic control unit 15 in the second standby state than in the first standby state.

The receiving power level of a signal is also called the RSSI (Received Signal Strength Indication) level.

Preferably, the control method comprises a step E100 for measuring the property G of the electricity supply of the electromechanical actuator 11 by the photovoltaic cell 25, a step E110 for comparing the measured property G relative to a predetermined threshold value S and a step E120 for entering an inhibition state of the control order receiving module 27 of the electronic control unit 15, when the measured property G is below the predetermined threshold value S.

Thus, when the measuring elements 28 of the property G related to the electricity supply of the electromechanical actuator 11 by the photovoltaic cell 25 determine a value below the predetermined threshold value S, the control order receiving module 27 is inhibited, so as to reduce the electricity consumption by the electronic control unit 15 and avoid depleting the battery 24.

In this way, the entry in the inhibition state of the control order receiving module 27 of the electronic control unit 15 is carried out when the result of the comparison of the measured property G related to the electricity supply of the electromechanical actuator 11 by the photovoltaic cell 25 relative to the predetermined threshold value S makes it possible to determine that the measured property G is below the predetermined threshold value S.

The passage of the measured property G of the electricity supply of the electromechanical actuator 11 by the photovoltaic cell 25 below the predetermined threshold value S may correspond either to the cutoff of the electricity supply of the electromechanical actuator 11 from the photovoltaic cell 25, or to the decrease of the brightness captured by the photovoltaic cell 25 below a threshold value.

Furthermore, the inhibition state of the control order receiving module 27 of the electronic control unit 15 is carried out from the second standby state of the control order receiving module 27 of the electronic control unit 15 and, in particular, only from this second standby state of the control order receiving module 27.

In this way, the entry in the inhibition state of the control order receiving module 27 of the electronic control unit 15 makes it possible to store and transport the motorized driving device 5 during a time period during which the battery 24 is kept beyond a minimum charge level.

As a non-limiting example, the predetermined threshold value S of the measured property G, allowing the passage from the second standby state to the inhibition state of the control order receiving module 27 of the electronic control unit 15, may be six volts.

Advantageously, the exit from the inhibition state of the control order receiving module 27 of the electronic control unit 15 is carried out once the measuring elements 28 of the property G, related to the electricity supply of the electromechanical actuator 11 by the photovoltaic cell 25, determine a value above the predetermined threshold value S, so as to return to the second standby state of the control order receiving module 27 of the electronic control unit 15.

Thus, when the measuring elements 28 of the property G determine a value above the predetermined threshold value S, the control order receiving module 27 of the electronic control unit 15 is reactivated, so as to allow the reception of a signal of an order sent by the control point 12, 14.

In this way, the exit from the inhibition state of the control order receiving module 27 of the electronic control unit 15 is carried out when the result of the comparison of the measured property G relative to the predetermined threshold value S makes it possible to determine that the measured property G is above the predetermined threshold value S.

The control order receiving module 27 of the electronic control unit 15 can thus be placed in at least four operating states, i.e.:

i) the control order receiving module 27 can be placed in an active state, in which the control order receiving module 27 is continuously listening for a control order signal;

ii) the control order receiving module 27 can be placed in a first standby state, called short standby state, in which the control order receiving module 27 is periodically listening for a signal of a control order, at a first wake-up frequency;

iii) the control order receiving module 27 can be placed in a second standby state, called long standby state, in which the control order receiving module 27 is periodically listening for a signal of a control order, at a second wake-up frequency. The second wake-up frequency of the control order receiving module 27 associated with the second standby state is lower than the first wake-up frequency of the control order receiving module 27 associated with the first standby state;

iv) the control order receiving module 27 can be placed in an inhibition state, in which the control order receiving module 27 is inhibited, so as not to listen to a control order signal.

In one embodiment of the invention, when the control order receiving module 27 of the electronic control unit 15 is placed in the second standby state, the control method comprises a step E140 for receiving a signal of an order by the control order receiving module 27, a step E150 for measuring the power level of the signal of the order received by the control order receiving module 27, a step E160 for comparing the power level of the signal of the received order relative to a predetermined threshold value F, a step E170 for decoding the frame of the signal of the order received by the control order receiving module 27, when the power level of the signal of the received order is above the predetermined threshold value F, and a step E210 for exiting the second standby state of the control order receiving module 27 of the electronic control unit 15, when the frame of the signal of the received order includes predetermined identifiers.

In practice, the step E140 for receiving a signal of an order by the control order receiving module 27 of the electronic control unit 15 is preceded by a step E130 for activating at least one selection element of the paired control point 12, 14, in particular of the paired remote control 14, with the electronic control unit 15.

The activation step E130 for at least one selection element of the control point 12, 14 is carried out by the user.

Furthermore, the activation step E130 for at least one selection element of the control point 12, 14 is carried out by pressing on one or several selection elements of the control point 12, 14.

The pressing on one or several selection elements of the control point 12, 14, defined for the activation step E130, corresponds to a predetermined sequence.

Preferably, the activation step E130 for at least one selection element of the control point 12, 14 is carried out by simultaneously pressing on several selection elements of the control point 12, 14.

Here and non-limitingly, the simultaneous pressing on the selection elements of the control point 12, 14, in particular of the remote control 14, corresponds to simultaneous pressing on the raising and lowering selection elements of the screen 2.

Thus, the exit from the second standby state is carried out following the transmission of a control order signal from the control point 12, 14 paired with the electronic control unit 15, to the reception of the signal of the control order during a listening period of the control order receiving module 27 of the electronic control unit 15, to the measurement of the power level of the signal of the received order and to the verification of the frame of the signal of the received order.

Advantageously, the predetermined identifiers of the frame of the signal of the received order correspond to the identifier of the control point 12, 14 paired with the electronic control unit 15, during the pairing step E40, and the identifier or identifiers of an activation sequence for at least one selection element of the control point 12, 14 according to a predetermined sequence, during the activation step E130.

Thus, a first condition is verified to guarantee that the signal of the received order is intended for the electromechanical actuator 11 of the motorized driving device 5. The first condition consists of verifying that the decoded frame of the signal of the received order contains the identifier of the control point 12, 14 paired with the electronic control unit 15 of the motorized driving device 5.

Furthermore, a second condition is verified to guarantee the signal of the received order has been transmitted for the purpose of exiting the second standby state. The second condition consists of verifying that the decoded frame of the signal of the received order contains the identifier(s) of an activation sequence of at least one selection element of the control point 12, 14.

Preferably, following the step E170 for decoding the frame of the signal of the received order, the control method comprises a step E180 for verifying the reception of the order signal during a consecutive listening period by the control order receiving module 27, the consecutive listening period being the listening period of the control order receiving module 27 following the listening period during which the signal of the order was received for the first time by the control order receiving module 27.

The step E210 for exiting the second standby state of the control order receiving module 27 of the electronic control unit 15 is carried out when the signal of the order is received during the consecutive listening period.

In practice, following the step E210 for exiting the second standby state of the control order receiving module 27 of the electronic control unit 15, the control method comprises the step E230 for entering the first standby state.

Advantageously, the control method comprises a step E220 for signaling the exit from the second standby state of the electronic control unit 15 of the motorized driving device 5.

In practice, the signaling step E220 is carried out by a movement of the screen 2 controlled by the motorized driving device 5.

Preferably, the movement of the screen 2 corresponds to a round-trip movement of the screen 2, in particular over a short distance that may for example be around one centimeter.

Alternatively, the signaling step E220 is carried out by transmitting a sound signal, in particular using a sound transmission element of the electronic control unit 15.

Here, the signaling step E220 is carried out after the step E210 for exiting the second standby state of the control order receiving module 27 of the electronic control unit 15.

If the measured power level of the signal of the received order, during the measuring step E150, is below the predetermined threshold value F, or the identifier of the control point 12, 14 does not correspond to that stored by the electronic control unit 15, during the pairing step E40, or the selection element of the control point 12, 14 activated, during the activation step E130, does not correspond to that of the predetermined sequence, or the signal of the order is not received during the consecutive listening period, the control order receiving module 27 of the electronic control unit 15 remains in the second standby state.

In practice, following the step E210 for exiting the second standby state of the control order receiving module 27 of the electronic control unit 15, the control method comprises a new step E240 for entering the configuration mode of the motorized driving device 5.

Thus, once the measuring elements 28 of the property G related to the electricity supply of the electromagnetic actuator 11 by the autonomous power supply device 26 detect the predetermined sequence of supply and cutoff periods of the electricity supply of the electromechanical actuator 11 from the autonomous power supply device 26, the electronic control unit 15 again enters the configuration mode of the motorized driving device 5.

Furthermore, the electronic control unit 15 is also configured to reset at least part of the data stored by the electronic control unit 15, after the simulation of the sequence of supply and cut off periods of the electricity supply of the electromechanical actuator 11, where the supply and cut off periods of the electricity supply are detected through measuring elements 28.

In this way, at least part of the data stored by the electronic control unit 15 is reset, following the detection by the measuring elements 28 of a sequence of periods respectively corresponding to the presence or absence of the electrical connection either connecting the photovoltaic cell 25 to the electromechanical actuator 11 or the battery 24 to the electromechanical actuator 11.

Figure 6:
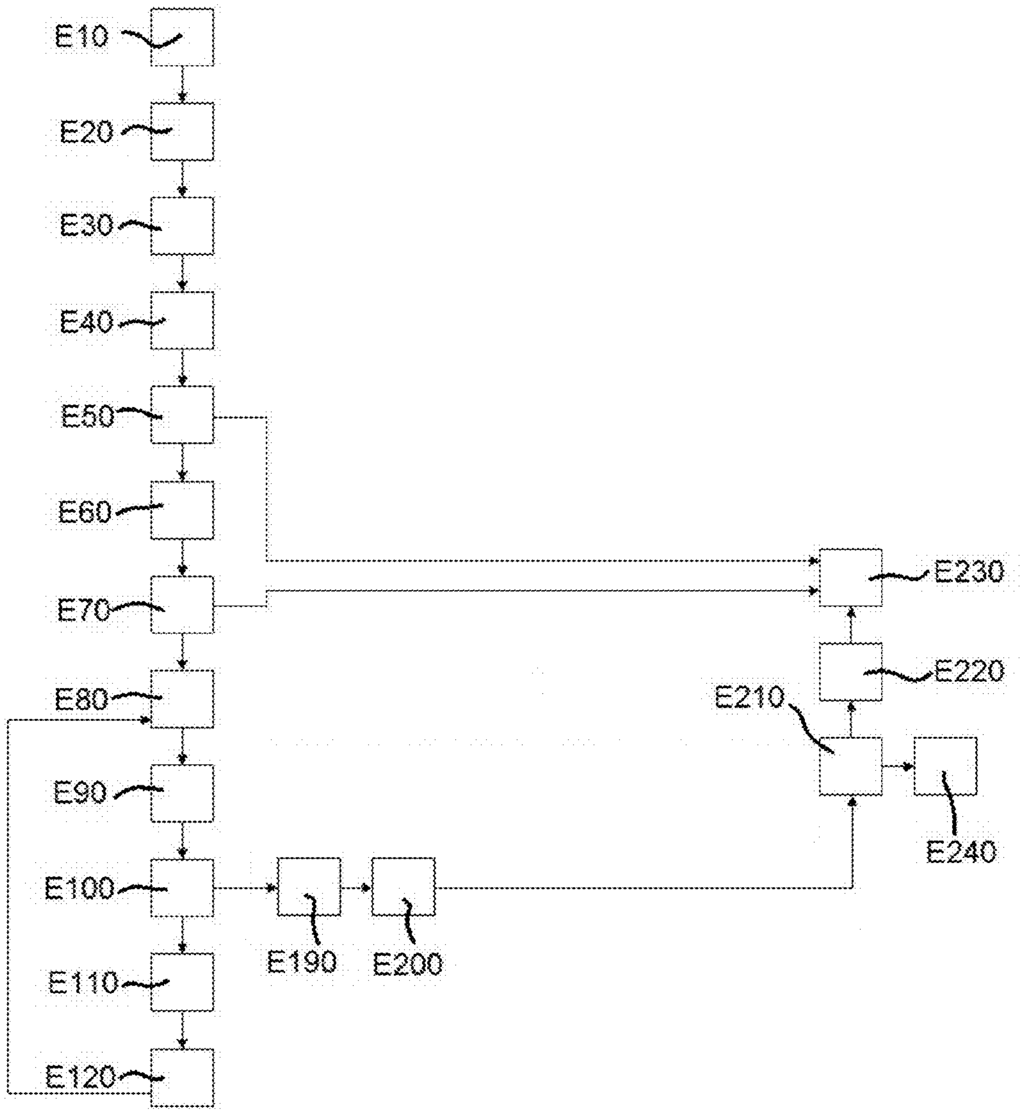
FIG. 6 is a block diagram similar to FIG. 5 for a method according to a second embodiment of the invention.

A control method according to a second embodiment is shown in FIG. 6. This method comprises the steps E10 to E120 and E210 to E240, which are identical to those mentioned for the first embodiment and are not described again in the following.

In this second embodiment, when the control order receiving module 27 of the electronic control unit 15 of the motorized driving device 5 is placed in the second standby state in step E80, the control method comprises a step E190, carried out after the measuring step E100 of the property G, for detecting supply and cutoff periods of the electricity supply of the electromechanical actuator 11 from the autonomous power supply device 26, only using measuring elements 28 for the property G related to the electricity supply of the electromechanical actuator 11 by the autonomous power supply device 26, a step E200 for simulating a sequence of supply and cutoff periods of the electricity supply of the electromechanical actuator 11, where the supply and cutoff periods of the electricity supply are detected through measuring elements 28, and the step E210 for exiting the second standby state of the control order receiving module 27 of the electronic control unit 15.

Thus, once the measuring elements 28 of the property G related to the electricity supply of the electromagnetic actuator 11 by the autonomous power supply device 26 detect the predetermined sequence of supply and cutoff periods of the electricity supply of the electromechanical actuator 11 from the autonomous power supply device 26, the control order receiving module 27 of the electronic control unit 15 exits the second standby state.

In a first case, the detected supply and cutoff periods of the electricity supply of the electromechanical actuator 11 are carried out from the photovoltaic cell 25.

An electricity supply period of the electromechanical actuator 11 from the photovoltaic cell 25 corresponds to the presence of the electrical connection connecting the photovoltaic cell 25 to the electromechanical actuator 11.

An electricity cut off period of the electromechanical actuator 11 from the photovoltaic cell 25 corresponds to the absence of the electrical connection connecting the photovoltaic cell 25 to the electromechanical actuator 11. The absence of electrical connection may be due to the removal of the photovoltaic cell 25 relative to the autonomous power supply device 26, to the cutoff of the electrical connection between the photovoltaic cell 25 and the electromechanical actuator 11, or to the loss of electrical connection between the photovoltaic cell 25 and the electromechanical actuator 11.

A cutoff of the electric connection between the photovoltaic cell 25 and the electromechanical actuator 11 may correspond to the disconnection of a power supply cable connecting these two elements.

A loss of electrical connection between the battery 24 and the electromechanical actuator 11 may correspond to the absence of signal between these two elements that may be caused by the absence of brightness received by the photovoltaic cell 25.

In a second case, the detected supply and cutoff periods of the electricity supply of the electromechanical actuator 11 are carried out from the battery 24.

An electricity supply period of the electromechanical actuator 11 from the battery 24 corresponds to the presence of the electrical connection connecting the battery 24 to the electromechanical actuator 11.

An electricity cut off period of the electromechanical actuator 11 from the battery 24 corresponds to the absence of the electrical connection connecting the battery 24 to the electromechanical actuator 11. The absence of electrical connection may be due to the removal of the battery 24 relative to the autonomous power supply device 26 or the cutoff of the electrical connection between the battery 24 and the electromechanical actuator 11.

A cutoff of the electric connection between the battery 24 and the electromechanical actuator 11 may correspond to the disconnection of a power supply cable connecting these two elements.

Advantageously, the step E200 for simulating a sequence of supply and cutoff periods of the electricity supply of the electromechanical actuator 11 is carried out during a predetermined time period T4 starting from the moment where the measuring elements 28 of the property G related to the electricity supply of the electromechanical actuator 11 by the autonomous power supply device 26 determine a first crossing of the predetermined threshold value S by a lower value, followed by a second crossing of the predetermined threshold value S by a higher value.

The first crossing of the predetermined threshold value S by a lower value, then the second crossing of the predetermined threshold value S by a higher value, are detected by the measuring elements 28 of the property G, so as to detect a cutoff period of the power supply and an electricity supply period of the electromechanical actuator 11 from the autonomous power supply device 26.

The cutoff periods of the electricity supply of the electromechanical actuator 11 that are detected may be carried out as previously described for the first and second cases.

As a non-limiting example, the predetermined time period T4 during which the simulation step E200 must be carried out is about two minutes.

Following the step E200, the steps E210 and E240 are carried out, as in the first embodiment.

The step E200 for simulating a sequence of supply and cutoff periods of the electricity supply of the electromechanical actuator 11 corresponds to a step for resetting at least part of the data stored by the electronic control device 15.

The data stored by the electronic control unit 15 that may be reset can be the end-of-travel positions of the screen 2, the obstacle detection threshold(s) and/or the control point 12, 14 paired with the electronic control unit 15 of the motorized driving device 5.

In the first case, the sequence of supply and cutoff periods of the electricity supply of the electromechanical actuator 11 is simulated by the connection and disconnection of an electrical connector 29 connected to the photovoltaic cell 25 cooperating with an electric connector 30 connected to the electronic control unit 15.

Thus, an electricity supply period of the electromechanical actuator 11 of the photovoltaic cell 25 is carried out by the electrical connection of the electrical connector 29 connected to the photovoltaic cell 25 with the electrical connector 30 connected to the electronic control unit 15. Furthermore, an electricity cut off period of the electromechanical actuator 11 from the photovoltaic cell 25 is carried out by the electrical disconnection of the electrical connector 29 connected to the photovoltaic cell 25 relative to the electrical connector 30 connected to the electronic control unit 15.

Here and as illustrated in FIG. 4, the electrical connector 29 is connected to the photovoltaic cell 25 using a power supply cable; and the electrical connector 30 is connected to the electronic control unit 15 using a power supply cable.

In such an embodiment, the electrical connectors 29, 30 respectively connected to said at least one photovoltaic cell 25 and to the electronic control unit 15 are accessible, in particular, by disassembling part of the box 9 of the concealing device 3.

In the second case, the sequence of supply and cutoff periods of the electricity supply of the electromechanical actuator 11 is simulated by the connection and disconnection of an electrical connector 31 connected to the battery 24 cooperating with an electric connector 32 connected to the electronic control unit 15.

Thus, an electricity supply period of the electromechanical actuator 11 of the battery 24 is carried out by the electrical connection of the electrical connector 31 connected to the battery 24 with the electrical connector 32 connected to the electronic control unit 15. Furthermore, an electricity cut off period of the electromechanical actuator 11 from the battery 24 is carried out by the electrical disconnection of the electrical connector 31 connected to the battery 24 relative to the electrical connector 32 connected to the electronic control unit 15.

Here and as illustrated in FIG. 4, the electrical connector 31 is connected to the battery 24 using a power supply cable; and the electrical connector 32 is connected to the electronic control unit 15 using a power supply cable.

In such an embodiment, the electrical connectors 31, 32 respectively connected to the battery 24 and to the electronic control unit 15 are accessible, in particular, by disassembling part of the box 9 of the concealing device 3.

The simulation step E200 may be carried out either by the connection and disconnection of the electrical connector 29 connected to the photovoltaic cell 25 cooperating with the electrical connector 30 connected to the electronic control unit 15 or by the connection and disconnection of the electrical connector 31 connected to the battery 24 cooperating with the electrical connector 32 connected to the electronic control unit 15.

In one example embodiment, the sequence of supply and cutoff periods of the electricity supply of the electromechanical actuator 11 comprises a first cut off period of the electricity supply during a predetermined time period, which may be approximately two seconds, an electricity supply period for a predetermined time period, which may be approximately seven seconds, and a second electricity cut off period for a predetermined time period, which may be approximately two seconds.

Following the simulation step E200, at least part of the data stored by the electronic control unit 15 is reset, in particular once the predetermined time period of the second cutoff period of the electricity supply has elapsed.

Owing to the present invention, the wireless control order receiving module of the electronic control unit of the motorized driving device may be placed in a first standby state when the control mode of the motorized driving device is active, and in a second standby state from the configuration mode of the motorized driving device. The control order receiving module of the electronic control unit of the motorized driving device is woken up at a longer wake-up frequency in the second standby state than in the first standby state.

In this way, following the activation of at least one selection element of the control point during the predetermined time period beginning after the step for pairing the control point with the electronic control unit of the motorized driving device, the control order receiving module of the electronic control unit is placed in the second standby state, so as to reduce the electricity consumption by the electronic control unit and avoid depleting the battery.

Many changes can be made to the example embodiment previously described without going beyond the scope of the invention defined by the claims.

In particular, the battery may be a single battery or a group of batteries connected using an electrical insulator.

Furthermore, the considered embodiments and alternatives may be combined to generate new embodiments of the invention.

The invention claimed is:

1. An operating control method of a motorized driving device of a closure or sun-protection home automation installation, the motorized driving device comprising:

an electromechanical actuator, an electronic control unit, the electronic control unit comprising at least one wireless control order receiving module, an autonomous power supply device, the autonomous power supply device comprising at least one battery, the electromechanical actuator being electrically connected to the autonomous power supply device, a control point, the motorized driving device being controlled by the control point using a wireless command, the control point comprising at least one selection element, the motorized driving device being configured to operate in at least:

a control mode, in which the control order receiving module of the electronic control unit can be placed in a first standby state, and a configuration mode, the method comprising at least:

a step for entering the configuration mode of the motorized driving device, a step for pairing the control point with the electronic control unit of the motorized driving device, following the step for entering the configuration mode of the motorized driving device, wherein the method comprises at least:

a step for activating at least one selection element of the control point during a predetermined time period beginning after the step for pairing the control point with the electronic control unit of the motorized driving device, a step for entering a second standby state of the control order receiving module of the electronic control unit, following the step for activating at least one selection element of the control point, where the second standby state of the control order receiving module of the electronic control unit has a wake-up frequency of the control order receiving module lower than the wake-up frequency of the control order receiving module of the electronic control unit in the first standby state.

2. The operating control method of a motorized driving device according to claim 1, wherein, following the step for activating at least one selection element of the control point, the method comprises:

a step for receiving an order signal by the control order receiving module of the electronic control unit, and a step for decoding the frame of the signal of the order received by the control order receiving module, and wherein the step for entering the second standby state of the electronic control unit of the motorized driving device is carried out when the frame of the signal of the received order includes predetermined identifiers.

3. The operating control method of a motorized driving device according to claim 2, wherein the predetermined identifiers of the frame of the signal of the received order correspond to the identifier of the control point paired with the electronic control unit of the motorized driving device, during the pairing step, and to the identifier or identifiers of an activation sequence for at least one selection element of the control point according to a predetermined sequence, during the step for activating.

4. The operating control method of a motorized driving device according to claim 2, wherein, following the step for decoding the frame of the signal of the received order, the method comprises a step for signaling the entry in the second standby state of the electronic control unit.

5. The operating control method of a motorized driving device according to claim 1, wherein the second standby state of the control order receiving module of the electronic control unit has a predetermined threshold value for the receiving power level of a signal above a predetermined threshold value of the receiving power level of a signal in the first standby state of the control order receiving module of the electronic control unit.

6. The operating control method of a motorized driving device according to claim 1, wherein the autonomous power supply device also comprises at least one photovoltaic cell, and wherein the method comprises at least:

a step for measuring a property of the power supply of the electromechanical actuator by said at least one photovoltaic cell, a step for comparing the measured property to a predetermined threshold value, and a step for entering an inhibition state of the control order receiving module of the electronic control unit, when the measured property is below the predetermined threshold value.

7. The operating control method of a motorized driving device according to claim 1, wherein, when the control order receiving module of the electronic control unit is placed in the second standby state, the method comprises at least:

a step for receiving an order signal by the control order receiving module of the electronic control unit, a step for measuring the power level of the signal of the order received by the control order receiving module of the electronic control unit, a step for comparing the power level of the signal of the order received to a predetermined threshold value, a step for decoding the frame of the signal of the order received by the control order receiving module, when the power level of the signal of the received order is above the predetermined threshold value, and a step for exiting the second standby state of the control order receiving module of the electronic control unit of the motorized driving device, when the frame of the signal of the received order includes predetermined identifiers.

8. The operating control method of a motorized driving device according to claim 7, wherein, following the step for decoding the frame of the signal of the received order, the control method comprises a step for verifying the reception of the order signal during a consecutive listening period by the control order receiving module, the consecutive listening period being the listening period of the control order receiving module following the listening period during which the signal of the order was received for the first time by the control order receiving module, and wherein the step for exiting the second standby state of the control order receiving module of the electronic control unit of the motorized driving device is carried out, when the signal of the order is received during the consecutive listening period.

9. The operating control method of a motorized driving device according to claim 7, wherein, following the step for exiting the second standby state of the control order receiving module of the electronic control unit, the control method comprises a step for entering the first standby state.

10. The operating control method of a motorized driving device according to claim 7, wherein the control method comprises a step for signaling the exit from the second standby state of the control order receiving module of the electronic control unit.

11. The operating control method of a motorized driving device according to claim 1, wherein, when the control order receiving module of the electronic control unit of the motorized driving device is placed in the second standby state, the method comprises at least:

a step for detecting supply and cutoff periods of the electricity supply of the electromechanical actuator from the autonomous power supply device, only using elements for measuring a property related to the electricity supply of the electromechanical actuator by the autonomous power supply device, a step for simulating a sequence of supply and cut off periods of the electricity supply of the electromechanical actuator, where the supply and cut off periods of the electricity supply are detected through measuring elements, and a step for exiting the second standby state of the control order receiving module of the electronic control unit.

12. The operating control method of a motorized driving device according to claim 11, wherein, following the step for exiting the second standby state of the control order receiving module of the electronic control unit, the control method comprises a step for entering the configuration mode of the motorized driving device.

13. The operating control method of a motorized driving device according to claim 11, wherein the control method comprises a step for signaling the exit from the second standby state of the control order receiving module of the electronic unit of the motorized driving device.

* * * * *